United States Patent [19]

Cereda

[11] Patent Number: 5,710,614
[45] Date of Patent: Jan. 20, 1998

[54] AUXILIARY CLIP-ON FRAMES FOR SPECTACLES

[75] Inventor: Sergio Cereda, Varese, Italy

[73] Assignee: Viva International Group, Fairfield, N.J.

[21] Appl. No.: 423,542

[22] Filed: Apr. 17, 1995

[51] Int. Cl.[6] .................. G02C 9/00; G02C 7/08
[52] U.S. Cl. .................. 351/48; 351/47; 351/57; 351/58
[58] Field of Search .................. 351/47, 48, 57, 351/58, 44, 41, 158, 124, 126, 140, 128; 2/12, 13, 426

[56] References Cited

U.S. PATENT DOCUMENTS

| 624,445 | 5/1899 | Bennum . |
|---|---|---|
| 1,619,659 | 3/1927 | Evans . |
| 1,749,676 | 3/1930 | Sadler et al. . |
| 1,881,132 | 10/1932 | Rheinberg . |
| 1,980,101 | 11/1934 | Schneider . |
| 2,017,233 | 10/1935 | Chester . |
| 2,282,637 | 5/1942 | Bouchard . |
| 2,678,584 | 5/1954 | Eyles ........................... 351/48 |
| 2,926,563 | 3/1960 | Lockwood . |
| 3,901,589 | 8/1975 | Bienenfeld . |

*Primary Examiner*—Hung X. Dang
*Attorney, Agent, or Firm*—Abelman, Frayne & Schwab

[57] ABSTRACT

An auxiliary spectacle frame has a substantially rigid elongate bridge member and dual monocular frames, the respective monocular frames being connected to the ends of the bridge member by spring members, whereby the monocular frames are omni-directionally movable relative to each other.

6 Claims, 3 Drawing Sheets

AUXILIARY CLIP-ON FRAMES FOR SPECTACLES

FIELD OF THE INVENTION

This invention relates to clip-on frames that can be attached to and removed from the frame of an existing pair of spectacles, the clip-on frame providing a support for tinted light filters adapted to reduce glare, resist ultraviolet transmission, or, ones which are intended by the wearer to be cosmetically attractive, including supplemental lenses that may be required by the user as reading glasses, or glasses to be used during the performance of delicate operations, in which magnification of the article being viewed is required.

BACKGROUND OF THE INVENTION

The prior art is replete with supplementary frames, that are hingedly attached to a main spectacle frame, such that supplementary lenses can be flipped upwardly when not required, or, moved into the users line of vision when the supplementary lenses are required.

It also has been proposed to provide clip-on frames that are laterally extendable against a spring force, and, in which the spring force is then employed to contract the clip-on frame into seated engagement with the main spectacle frame.

In antiquity, spectacles having a spring action in a bridge of the frame are known, permitting the frame to be clipped onto the bridge of the users nose, commonly, to the acute discomfort of the user.

Common spectacles, themselves, vary in a multitude of differences, including the ocular spacing of the lenses, the shape of the lens frames and the thickness thereof, the extent of bowing of the spectacle frame on either side of the nose bridge of the frame, the actual peripheral size of the lenses, and other variations, each of which militate against the provision of a clip-on frame that can be employed with a wide variety of spectacles of differing dimensional characteristics.

Attempts in that respect have lead to expensive and cumbrous constructions employing screw mechanisms, guide tracks and the like, which inherently are expensive to manufacture, and also which inherently require a degree of manual dexterity on the part of the user in assembling the supplemental frame onto an existing pair of spectacles.

OBJECT OF THE INVENTION

It is an object of this invention to provide a auxiliary clip-on frame for an existing pair of spectacles that requires little or no manual dexterity on the part of the user in attaching the supplementary frame to the existing pair of spectacles.

It is also an object of this invention to provide a auxiliary clip-on frame for spectacles that can readily accommodate itself to the frontal bow in the existing pair of spectacles, variations in the size of the lenses oft he existing spectacles, and also, angular displacement of one of the lenses of the existing pair of spectacles relative to the other of the lenses of the existing pair of spectacles, that either has been intentionally induced in the existing pair of spectacles, or which has been inadvertently introduced into the existing pair of spectacles by rough handling of those spectacles.

SUMMARY OF THE INVENTION

According to the present invention, an auxiliary clip-on frame is provided for existing spectacles that has the capability of flexing omni-directionally, in order to accommodate dimensional variations and positional variations of the lenses of an existing pair of spectacles.

According to the present invention, the clip-on frame incorporates a bridge member that is substantially rigid at least in the vertical direction, and which preferably is also substantially rigid in the horizontal plane of the bridge member.

At its respective longitudinal ends, the bridge member is provided with resilient members, that are rigidly attached to frames of the clip-on spectacles, the respective frames of the clip-on spectacles thus being supported for omni-directional movement relative to each other.

The respective frames are each provided with hook-shaped clips for clipping over the frames of an existing pair of spectacles, or, over the edges of the lenses of the existing pair of spectacles in the event that they happen to be frameless spectacles.

By virtue of the omni-directional flexibility of the respective frames of the clip-on spectacles relative to each other, the respective frames of the clip-on spectacles can accommodate variations in the extent of frontal bowing of the existing pair of spectacles, variations in the ocular spacing of the lens frames of the existing pair of spectacles, and other variations including the perimetral configuration of the respective frames of the existing pair of spectacles.

Additionally, the omni-directional flexibility of the respective frames of the clip-on spectacles militates against unintended deformation of the clip-on spectacles, such as can occur when the clip-on spectacles are carried in a users pocket, or dropped, or, accidentally sat upon.

DESCRIPTION OF THE DRAWINGS

The invention will now be described with reference to the accompanying drawings, which illustrate preferred embodiments of the invention, and, in which.

DESCRIPTION OF THE PREFERRED EMBODIMENTS

Figure 1:
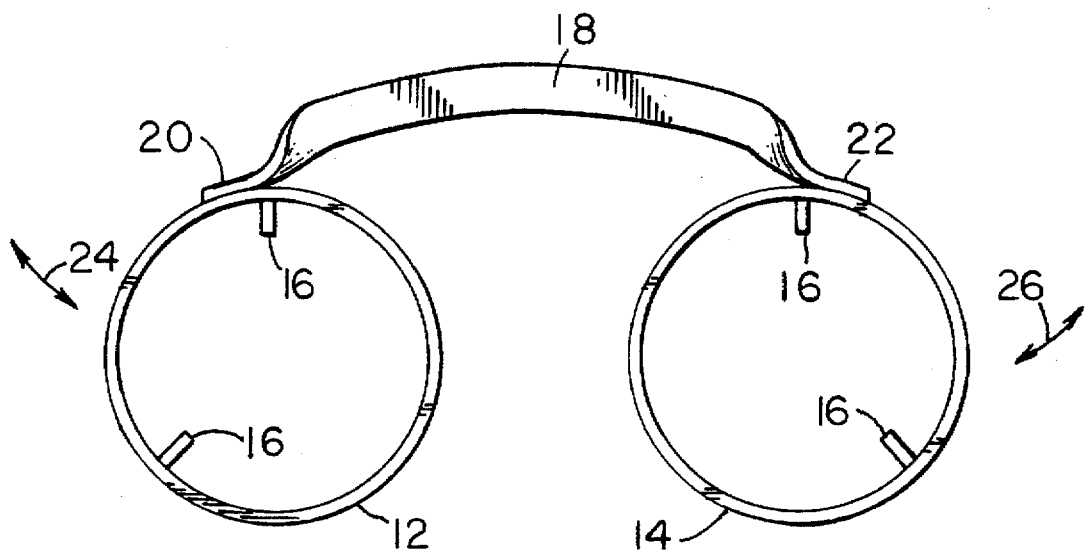
FIG. 1 illustrates a front elevation of a basic form of the clip-on spectacles.
Figure 2:
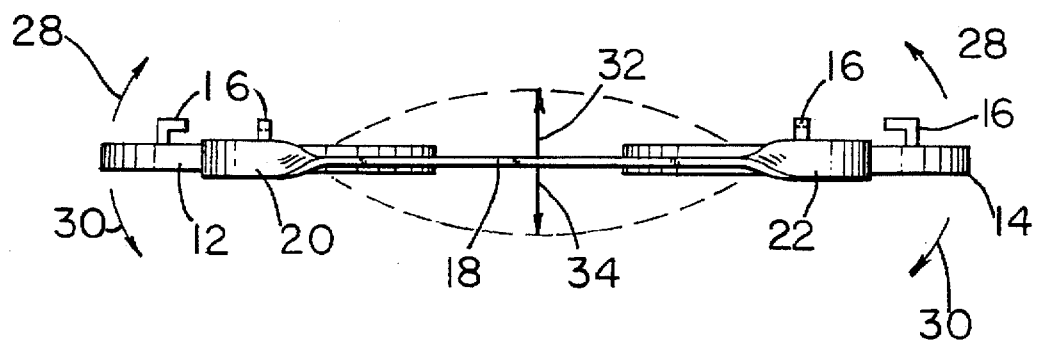
FIG. 2 is a plan view of FIG. 1.

Referring firstly to FIGS. 1 and 2, a basic-form of the clip-on spectacles is disclosed, which includes two lens frames 12 and 14 each provided with hook like members 16 permitting the clip-on spectacles to be secured on the perimeter of an existing pair of spectacles.

The lenses are not shown in the drawings. Such lenses may, however, be of any convenient form including tinted lenses providing sunglasses, ophthalmic lenses operative to modify the power of the existing pair of spectacles, or, appropriately colored lenses that provide no useful function other than to provide cosmetic appeal.

The respective lens frames 12 and 14 are connected one to the other by a strip of spring steel providing a bridging member 18. The central portion of the bridging member 18 is arranged with its major dimension vertical to provide maximum strength, and is twisted to 90° at its ends 20 and 22, the ends 20 and 22 being attached to the lens frames 12 and 14 in any convenient manner, such as by adhesives, by molding the frames 14 in-situ around the ends 20 and 22 of the bridging member 18, by tack-welding, or, by other procedures that are named in the art, such as by screws, rivets and the like.

As will be readily apparent from FIG. 1, the respective lens frames 12 and 14 can be moved in the direction of the arrows 24 and 26, in order to permit the clip-on frame to be clipped over the perimeter of the lenses of an existing pair of spectacles. Additionally, and as illustrated in FIG. 2, the respective lens frames each can move in the direction of the arrows 28 and 30 by flexing of the bridging member 18 in the directions of the arrows 32 and 34, the bridging member 18 then acting as a spring member to hold the retaining hooks 16 firmly in position on the existing pair of spectacles, while at the same time accommodating frontal bowing of the existing pair of spectacles, and also angular displacement of the respective lens frames of the existing pair of spectacles, in this manner providing a secure and rattle-free attachment of the clip-on spectacles to the existing pair of spectacles, the user requiring minimal dexterity in applying the clip-on spectacles to the frame of an existing pair of spectacles.

Figure 3:
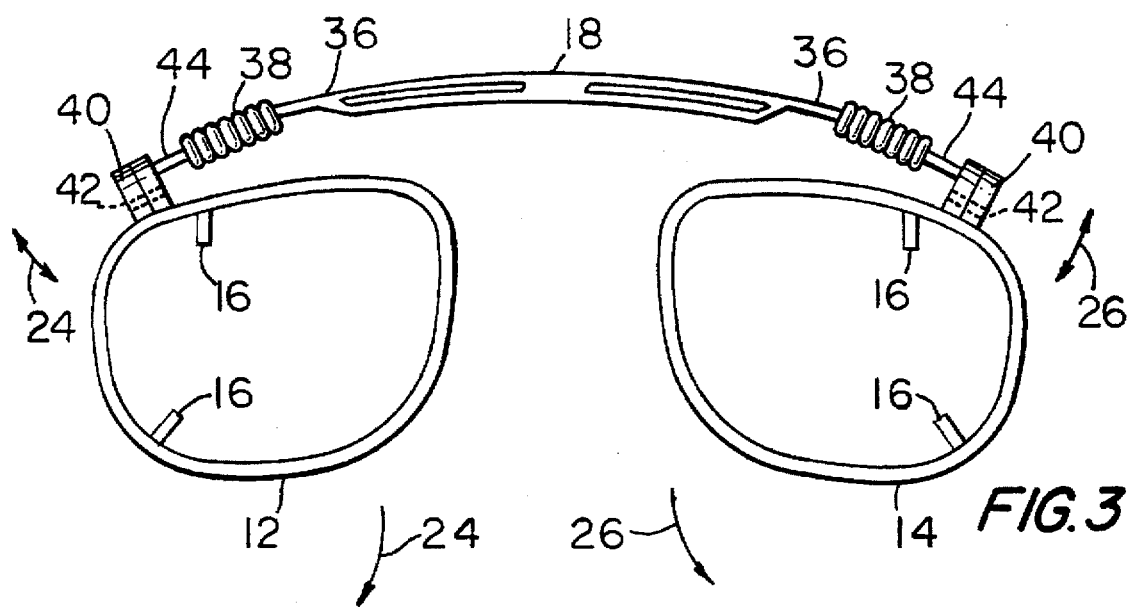
FIG. 3 is a front elevation of a preferred form of the clip-on spectacles of the invention.

Referring now to FIG. 3, a preferred form of the clip-on spectacles of FIGS. 1 and 2 is illustrated, corresponding reference numerals having been employed for those members in common with FIGS. 1 and 2.

In FIG. 3, the bridging member 18 is formed as an essentially rigid member that is substantially rigid both in vertical and lateral directions. Optionally the bridging member 18 can be fabricated from stainless spring-steel wire, or, it can be formed as a metal stamping, or, it can be molded as a substantially rigid member of a suitable plastics material.

At its opposite ends the bridging member 18 proceeds into pintles 36, which themselves can be of simple rod-like form, the pintles 36 being forcibly received within the bore of coil springs 38, and suitably secured therein, such as by adhesives, brazing, soldering, or, in any other convenient manner that will provide an interference fit of the pintles 36 within the coil springs 38.

The respective lens frames 12 and 14 each are provided with a clamp 40, which is activated by a screw 42 in the usual manner in order to provide for contraction of the respective frames 12 and 14 around the perimeter of the contained lens.

The respective clamping members each are provided with a pintle 44, which similarly to the pintles 36 also is positioned within a bore of one of the coil springs 38, and, is secured therein in any suitable manner as is discussed above.

The coil springs 38 provide for movement of the respective lens frames 12 and 14 in the directions of the arrows 26, and additionally, support the lens frames 12 and 14 for omni-directional movement relative to each other and relative to the bridging member 18, as is now described with reference to FIGS. 4 and 5.

Figure 4:
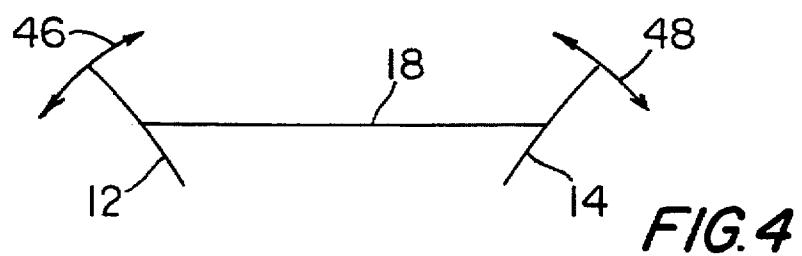
FIGS. 4 and 5 are diagrams illustrating the omni-directional flexibility of the respective lens frames of the clip-on spectacles; and, FIG. 6 illustrates a preferred manner of resiliently securing the lens frames of the clip-on spectacles to the bridging member thereof.
Figure 5:
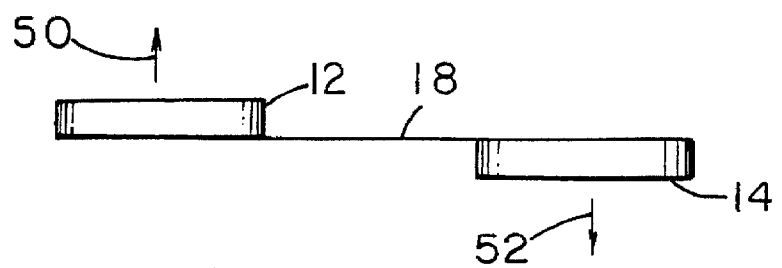

With reference to FIGS. 4 and 5, not only can the respective lens frames 12 and 14 move in the general plane of the bridging member 18 in the direction of the arrows 24 and 26, but also, the respective lens frames 12 and 14 can angle relative to each other in the directions of the arrows 46 and 48, in order to accommodate bowing of the lens frames 12 and 14 to the frontal bow of the existing pair of spectacles.

Additionally, and as illustrated in FIG. 5, the respective lens frames 12 and 14 can rotate around the axis provided by the bridging member 18 in the directions of the arrows 50 and 52, thus providing for any misalignment, whether intentional or accidental, of the lens frames in the existing pair of spectacles.

In this manner, the respective lens frames 12 and 14 of the clip-on spectacles are supported for omni-directional movement relative to each other and relative to the bridge member 18, whereby, one size of the clip-on spectacles can be attached to a wide variety of spectacles falling within a specific range of sizes, thus requiring only a limited range on clip-on spectacles to accommodate all sizes of spectacles, and, all variants within such spectacles, such as ocular spacing of the lenses of the spectacles, the perimetral shape and orientation of the lenses of the existing spectacles, including deviations in the frontal bowing of the existing spectacles.

Additionally, by virtue of the resilient support of the lens frames 12 and 14 of the clip-on spectacles of the present invention, there is far less likelihood of distortion, bending and breakage of the clip-on spectacles when carried in a users pocket, or, when carelessly dropped, crushed, or impacted upon by other objects.

Figure 6:
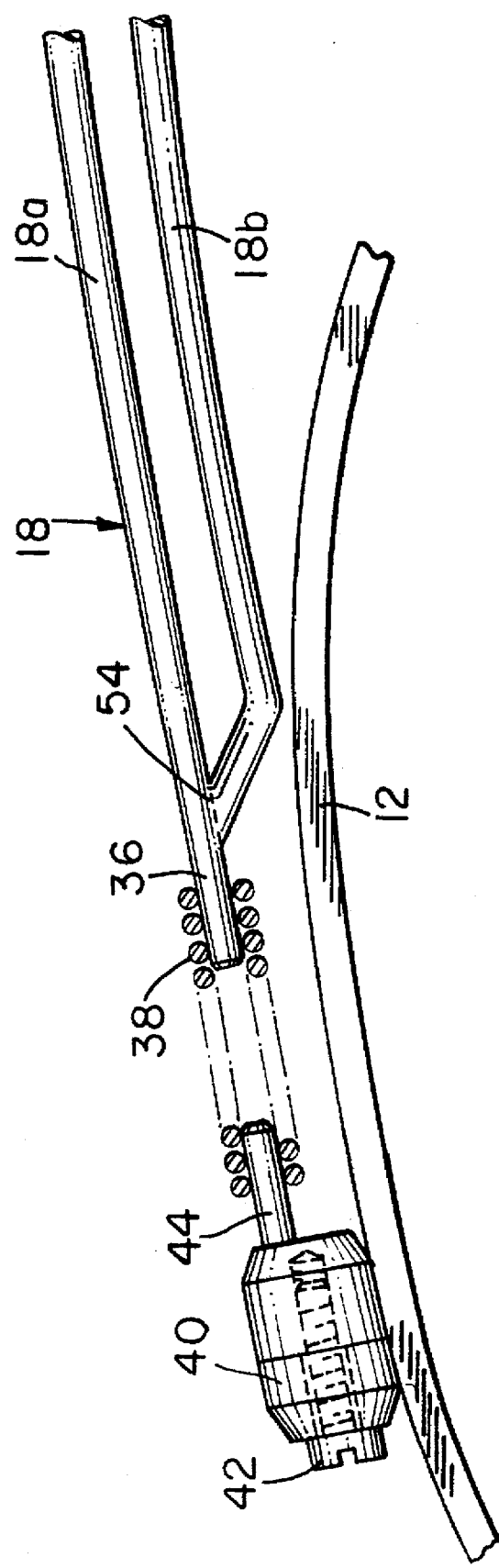

FIG. 6 illustrates to a larger scale the manner in which the lens frame 12 of FIG. 3 is supported from the end of the bridging member 18, which itself is formed from rod-like members 18a and 18b that have been rigidly assembled and secured to each other at 54 by welding, brazing, soldering, or any other convenient means such as is well known in the art.

The lens frames 12 and 14 can be formed in any convenient manner from metals, injection-molded plastics material and the like, the clamping members 40 subsequently being attached to the frames 12 and 14, or, if convenient being molded integrally therewith, as can be the hook members 16.

I claim:

1. An auxiliary clip-on spectacle frame for detachable attachment to a conventional spectacle frame comprising: an elongate bridge member having opposite axial ends and which is substantially rigid at least in the plane of said auxiliary spectacle frame;

spring members joined at a first end to the opposite axial ends of said rigid bridge member, each of said spring members extending outwardly from the associated ends of said rigid bridge member;

a monocular frame rigidly attached to a second opposite end of each of said springs whereby each of said monocular frames is freely movable omni-directionally relative to the other and relative to said bridge member; and, clip members carried by each said monocular frame for securement of said monocular frame to said conventional spectacle frame, said springs providing a resilient bias acting to maintain said clip members in secure engagement on said conventional spectacle frame.

2. The auxiliary clip-on spectacle frame of claim 1, wherein said elongate bridge member is provided by a strip, which strip terminates at its opposite ends in a section of spring-like material to provide said spring members, said opposite ends being rotated to extend transverse to the plane of said bridge member.

3. The auxiliary clip-on spectacle frame of claim 2, wherein said ends of said spring members are attached directly to said respective monocular frames.

4. The auxiliary clip-on spectacle frame of claim 1, wherein each said spring member is a coil spring.

5. The auxiliary clip-on spectacle frame of claim 4, wherein said elongate bridge member is provided by a rod, said springs are joined by an interference fit on opposite ends of said rod, and said monocular frames each include a projecting rod-like member that internally engages the free end of one of said springs in an interference fit.

6. The auxiliary clip-on spectacle frame of claim 4, wherein said elongate bridge member is provided by first and second rods extending in substantially parallel relation, and the ends of said first rod are joined to said second rod at positions spaced inwardly from the respective ends of said first rod.

* * * * *